United States Patent
Si et al.

(10) Patent No.: US 12,112,490 B2
(45) Date of Patent: Oct. 8, 2024

(54) METHOD AND APPARATUS FOR STITCHING DUAL-CAMERA IMAGES AND ELECTRONIC DEVICE

(71) Applicants: STATE GRID ZHEJIANG ELECTRIC POWER CO., LTD. TAIZHOU POWER SUPPLY COMPANY, Zhejiang (CN); TAIZHOU ECONOMIC DEVELOPMENT ZONE TRANSPORTATION INSPECTION BRANCH OF TAIZHOU HONGDA ELECTRIC POWER CONSTRUCTION CO., LTD., Zhejiang (CN)

(72) Inventors: Jiandong Si, Zhejiang (CN); Jian Yang, Zhejiang (CN); Chen Zhou, Zhejiang (CN); Jianhua Lv, Zhejiang (CN); Guode Ying, Zhejiang (CN); Qian Yu, Zhejiang (CN); Qian Zhang, Zhejiang (CN); Huang Zhang, Zhejiang (CN); Huanghao Ying, Zhejiang (CN); Xiaofei Wang, Zhejiang (CN); Xi Yang, Zhejiang (CN); Weizhong Chen, Zhejiang (CN); Dongqi Lu, Zhejiang (CN); Ge Zhou, Zhejiang (CN); Jieli Bao, Zhejiang (CN); Huiyong Qiu, Zhejiang (CN)

(73) Assignees: State Grid Zhejiang Electric Power Co., Ltd. Taizhou Power Supply Company, Zhejiang (CN); Taizhou Economic Development Zone Transportation Inspection Branch of Taizhou Hongda Electric Power Construction Co., Ltd., Zhejiang (CN)

( * ) Notice: Subject to any disclaimer, the term of this patent is extended or adjusted under 35 U.S.C. 154(b) by 457 days.

(21) Appl. No.: 17/277,657

(22) PCT Filed: May 11, 2020

(86) PCT No.: PCT/CN2020/089627
§ 371 (c)(1),
(2) Date: Dec. 21, 2021

(87) PCT Pub. No.: WO2020/228680
PCT Pub. Date: Nov. 19, 2020

(65) Prior Publication Data
US 2022/0101542 A1    Mar. 31, 2022

(30) Foreign Application Priority Data
May 10, 2019    (CN) .......................... 201910390273.4

(51) Int. Cl.
*G06T 7/33*    (2017.01)
*G06T 3/60*    (2024.01)
(Continued)

(52) U.S. Cl.
CPC ............... *G06T 7/33* (2017.01); *G06T 3/60* (2013.01); *H04N 23/80* (2023.01); *G06T 2207/20221* (2013.01); *H04N 23/698* (2023.01)

(58) Field of Classification Search
CPC ... G06T 7/33; G06T 3/60; G06T 2207/20221; G06T 2200/32; G06T 3/14; H04N 23/80;
(Continued)

(56) References Cited

U.S. PATENT DOCUMENTS 9,224,189 B2 * 12/2015 Liu ..................... G06T 7/33
9,852,347 B2 * 12/2017 Lee ..................... G06V 20/586
(Continued)

FOREIGN PATENT DOCUMENTS

CN    101853524 A    10/2010
CN    104574339 A    4/2015
(Continued)

OTHER PUBLICATIONS

International Search Report (ISR) received from corresponding PCT/CN2020/089627 dated Aug. 13, 2020.

(Continued)

*Primary Examiner* — Mia M Thomas
(74) *Attorney, Agent, or Firm* — ArentFox Schiff LLP

(57) ABSTRACT

Disclosed are apparatus, electronic device, and method for stitching dual-camera images. The method includes collecting two images having overlapping photographic content. The method includes extracting and matching feature points of the two images. The method includes roughly aligning the two images by using a homography matrix. The method includes accurately aligning the two images by using a least squares method to complete stitching the two images.

13 Claims, 2 Drawing Sheets

(51) Int. Cl.
*H04N 23/698* (2023.01)
*H04N 23/80* (2023.01)

(58) Field of Classification Search
CPC .... H04N 23/698; H04N 5/2624; H04N 23/45; H04N 5/2628; Y02T 10/40
See application file for complete search history.

(56) References Cited

U.S. PATENT DOCUMENTS

| | | | |
|---|---|---|---|
| 10,089,778 B2* | 10/2018 | Moule | G06T 7/593 |
| 11,176,425 B2* | 11/2021 | Revaud | G06N 3/044 |
| 2009/0022421 A1* | 1/2009 | Uyttendaele | G06T 3/4038 |
| | | | 382/284 |
| 2013/0156336 A1* | 6/2013 | Suk | G06T 3/14 |
| | | | 382/284 |
| 2015/0138309 A1* | 5/2015 | Seok | G06T 3/4038 |
| | | | 348/36 |
| 2016/0212338 A1* | 7/2016 | Seok | H04N 23/698 |
| 2016/0217558 A1* | 7/2016 | Lee | G06V 20/58 |
| 2018/0060682 A1* | 3/2018 | Cho | G06T 3/153 |
| 2019/0051193 A1* | 2/2019 | Gutierrez | G08G 5/0021 |
| 2020/0027243 A1* | 1/2020 | Ziegler | H04N 13/246 |

FOREIGN PATENT DOCUMENTS

| | | |
|---|---|---|
| CN | 105472272 A | 4/2016 |
| CN | 106127690 A | 11/2016 |
| CN | 106709894 A | 5/2017 |
| CN | 107220580 A | 9/2017 |
| CN | 109389555 A | 2/2019 |
| CN | 110288511 A | 9/2019 |
| WO | 2016165016 A1 | 10/2016 |

OTHER PUBLICATIONS

First Office Action issued for Chinese Patent Application No. 201910390273.4, mailed Nov. 3, 2022.

Du Pei-Ming et al., Image mosaic based on robust iterative optimization, Computer Engineering & Science, Apr. 2014, vol. 36, No. 4, China Academic Journal Electronic Publishing House.

* cited by examiner

METHOD AND APPARATUS FOR STITCHING DUAL-CAMERA IMAGES AND ELECTRONIC DEVICE

CROSS-REFERENCE TO RELATED APPLICATIONS

This is a national stage application filed under 37 U.S.C. 371 based on International Patent Application No. PCT/CN2020/089627, filed May 11, 2020, which claims priority to Chinese Patent Application No. 201910390273.4 filed with the CNIPA on May 10, 2019, the disclosure of which is incorporated herein by reference in its entirety.

TECHNICAL FIELD

The present application relates to the field of image processing technology, for example, a method and apparatus for stitching dual-camera images and an electronic device.

BACKGROUND

Image stitching is the process of combining overlapping fields of view of two or more photographic images to generate a high-resolution image.

In image stitching using a traditional stitching method, a visible seam tends to appear between the stitched two images. The reason why a seam is formed may include that lighting conditions are not exactly the same in two images, the background varies between two images having the same continuous foreground, etc. What are mainly processed in image stitching include parallax, lens distortion, a scene motion and an exposure difference.

For panoramic stitching, an ideal image set has a reasonable amount of overlap (at least 15% to 30%) to overcome lens distortion and has sufficient detectable features. This set of images has consistent exposure between frames so that a seam is least likely to occur.

In most automatic stitching methods used by image stitching software on the market, the estimation process needs to be initialized, and an initialization command is usually input and provided by a user so that images are approximately aligned, or fixed image sorting is required. Initialization mainly means that a camera needs to scan horizontally or vertically, arranges images into a square image matrix, or has a user interface for roughly positioning an image with a mouse.

SUMMARY

The present application provides a method and apparatus for stitching dual-camera images and an electronic device to avoid the preceding situation.

In a first aspect, an embodiment of the present application provides a method for stitching dual-camera images. The method includes collecting two images having overlapping photographic content: extracting and matching feature points of the two images: roughly aligning the two images by using a homography matrix; and accurately aligning the two images by using a least squares method to complete stitching the two images.

In a second aspect, an embodiment of the present application provides an apparatus for stitching dual-camera images. The apparatus includes a collection module configured to collect two images having overlapping photographic content: a feature point extraction and matching module configured to extract and match feature points of the two images: a rough-alignment module configured to roughly align the two images by using a homography matrix; and a stitching module configured to accurately align the two images by using a least squares method to complete stitching the two images.

In a third aspect, an embodiment of the present application provides an electronic device. The electronic device includes a processor; and a storage configured to store instructions executable by the processor. The processor is configured to perform the method in the first aspect by using the executable instructions.

DETAILED DESCRIPTION

Terms used in the present application are intended only to describe embodiments and not to limit the present application. Unless otherwise expressly indicated by the context, singular forms "a", "an" and "the" used in the present application and the appended claims are intended to include plural forms. It is also to be understood that the term "and/or" used herein refers to and encompasses any or all possible combinations of at least one associated listed item.

Figure 1:
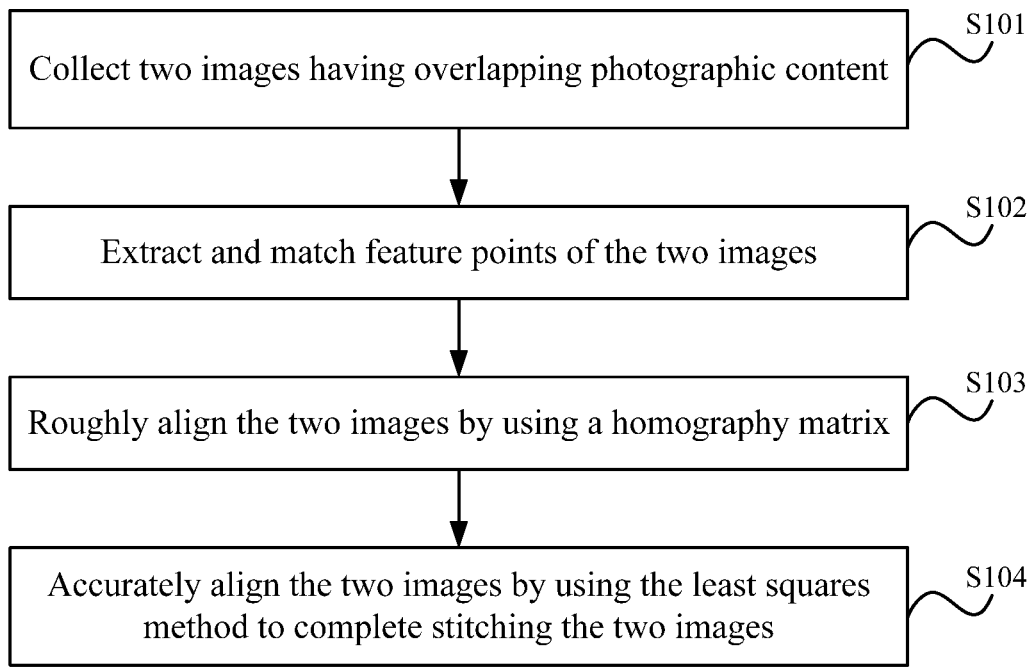
FIG. 1 is a flowchart of a method for stitching dual-camera images according to an embodiment of the present application.

As shown in FIG. 1, a method for stitching dual-camera images includes steps S101 to S104. In the present application, the method for stitching dual-camera images is described in detail by using computer-room device images photographed by dual cameras as an example.

In step S101, two images having overlapping photographic content are collected.

The computer-room device images photographed by dual cameras may be images of the same position photographed at different angles. The images collected here may be two images with a 30% repetition. Of course, the stitching method of the present application may be extended and applicable to three or more images.

In step S102, feature points of the two images are extracted and matched.

The feature points of the two collected images may be Scale Invariant Feature Transform (SIFT) feature points by way of example and may of course be other types of feature points. The reason why SIFT feature points are selected is that SIFT feature points have not only scale invariance but also rotation invariance and can be used in the detection and description of local features in the images. Extreme points are searched for in a scale space. The obtained extreme points are SIFT feature points of the images. Moreover, the positions, scales and rotation invariants of the extreme points are extracted.

Even if the rotation angle, image brightness or shooting angle is changed, a good detection result can be obtained with the scale invariance.

In an embodiment, extracting and matching the feature points of the two images includes finding a feature point in a scale space of each of the two images separately according to an image multi-scale space and a Gaussian convolution kernel; determining the gradient direction and the amplitude of the feature point by using the gradient distribution characteristic of pixels in the neighborhood of the feature point; performing statistics on gradient directions and amplitudes corresponding to the pixels in the neighborhood of the feature point by using a histogram; and constructing a KD-Tree data structure for storing the feature points of the two images and matching the feature points of the two images.

According to scale invariance, in a scale space, multiple Gaussian convolution kernels having different image scale parameters σ are used to convolve an image and then multiple two-dimensional scale images are filtrated. The value of an image scale parameter σ can represent the degree of fineness of the extracted image features. The larger the value of σ, the rougher the extracted image features after convolution. The smaller the value of σ, the finer the extracted image features after convolution.

For a feature point (x, y), the Gaussian convolution kernel are as below.

$$G(x, y, \sigma) = \frac{1}{2\pi\sigma^2} e^{-(x^2+y^2)/2\sigma^2} \quad (1)$$

An image in a multi-scale space is defined as below.

$$L(x,y,\sigma)=G(x,y,\sigma)*I(x,y) \quad (2)$$

In the formula (2), I(x, y) denotes an input image.

A differential processing is performed on Gaussian convolution kernels in two different scales and the input two images by using the formula below.

$$D(x,y,\sigma)=L(x,y,k\sigma)-L(x,y,\sigma) \quad (3)$$

According to rotation invariance, feature points in the scale space is found out on the filtrated multiple two-dimensional scale images D(x, y, σ), the gradient direction and amplitude of each feature point are determined by using the gradient distribution characteristic of pixels in the neighborhood of the each feature point, and then the stable direction (that is, the main direction) of the local structure of the each feature point is calculated by using an image gradient histogram. The gradient directions and amplitudes of pixels in the image region having a radius of 3×1.5σ and using the each feature point as the center of the region are calculated. The gradient direction and amplitude of the each feature point L(x, y) are also calculated. In formulas (4) and (5), m(x, y) denotes amplitude and θ(x, y) denotes gradient direction.

$$m(x, y) = \sqrt{[L(x+1, y) - L(x-1, y)]^2 + [L(x, y+1) - L(x, y-1)]^2} \quad (4)$$

$$\theta(x, y) = \arctan\left(\frac{L(x, y+1) - L(x, y-1)}{L(x+1, y) - L(x-1, y)}\right) \quad (5)$$

After the gradient direction and amplitude of the feature point are calculated and the gradient directions and amplitudes of the pixels in the neighborhood of the feature point are also calculated, statistics on the gradient directions and amplitudes of the feature point and the gradient directions and amplitudes of the pixels in the neighborhood of the feature point are performed by using the histogram. The gradient direction ranges from 0 degree to 360 degree. The histogram may be configured to have a total of 10 columns, each column occupying 36 degrees: or configured to have a total of 8 columns, each column occupying 45 degrees. In this manner, in the gradient direction, the horizontal axis of the histogram indicates the angle, the vertical axis of the histogram indicates the accumulation of gradient amplitudes, and the gradient direction corresponding to the peak of the histogram indicates the main direction of the feature point.

After the feature points of the two images are obtained, the feature points of the two images are matched. To speed up the matching speed, a KD-Tree data structure is constructed to store the feature points of the two images.

To improve the accuracy of matching the feature points, the matching feature points are searched for by using the principles below.

$$\text{Dist}_{nearest}=\|SP_1(x,y)-SP_2(x_0,y_0)\| \quad (6)$$

$$\text{Dist}_{subNearest}=\|SP_1(x,y)-SP_2(x_1,y_1)\| \quad (7)$$

In the formulas (6) and (7), $SP_2(x_0, y_0)$ denotes a feature point that is located in the image B of the two images and has the shortest Euclidean distance from the feature point $SP_1(x, y)$ in the image A of the two images. $\text{Dist}_{nearest}$ denotes the Euclidean distance between the nearest feature point $SP_2(x_0, y_0)$ in the image B and the feature point $SP_1(x, y)$ in the image A, that is, the $\text{Dist}_{nearest}$ denotes the nearest-point Euclidean distance. $SP_2(x_1, y_1)$ denotes a feature point that is located in the image B and has the second shortest Euclidean distance from the feature point $SP_1(x, y)$ in the image A. $\text{Dist}_{subNearest}$ denotes the Euclidean distance between the second nearest feature point $SP_2(x_1, y_1)$ in the image B and the feature point $SP_1(x, y)$ in the image A, that is, the $\text{Dist}_{subNearest}$ denotes the subnearest-point Euclidean distance.

$$\text{Dist}_{nearest}/\text{Dist}_{subNearest}<\text{Threshold} \quad (8)$$

The parameter Threshold in the formula (8) denotes a threshold value that can be set by a user or adjusted as a matter of experience. When the ratio of the nearest-point Euclidean distance to the subnearest-point Euclidean distance is less than the threshold, the feature point in the image A matches the feature point in the image B successfully.

In step S103, the two images are roughly aligned by using a homography matrix.

With the image A as a reference image, M feature points $a_i$ are randomly selected from the image A, and M feature points $b_i$ that match the feature points $a_i$ in a one-to-one correspondence are found in the image B, where i is an integer and satisfies 0<i≤M.

The homography matrix is calculated through the M feature points $a_i$ and the M feature points bi, feature points in the image A other than the feature points $a_i$ are projected onto the image B through a space transformation of the homography matrix, and the number of accurate matching pairs between the feature points in the image A other than the feature points $a_i$ and feature points in the image B other than the feature points $b_i$ are counted.

The homography matrix is a mapping between points. The exact position of the point corresponding to a feature point in one image can be found in another image by using the homography matrix. Here, the homography matrix is obtained by correspondingly calculating the feature points $a_i$ and the feature points $b_i$ and may be a 3×3 matrix.

$$H = \begin{bmatrix} h_{00} & h_{01} & h_{02} \\ h_{10} & h_{11} & h_{12} \\ h_{20} & h_{21} & h_{22} \end{bmatrix}$$

Thus, the mapping between the two images is as below.

$$\begin{bmatrix} x_1 \\ y_1 \\ 1 \end{bmatrix} = \begin{bmatrix} h_{00} & h_{01} & h_{02} \\ h_{10} & h_{11} & h_{12} \\ h_{20} & h_{21} & h_{22} \end{bmatrix} \begin{bmatrix} x_2 \\ y_2 \\ 1 \end{bmatrix} \quad (9)$$

The preceding steps are repeated multiple times to obtain a plurality of homography matrices. One homography matrix having a largest number of accurate matching pairs is selected from the homography matrices to serve as the target homography matrix. The number of times the homography matrix is repeatedly obtained is greater than or equal to 1000, for example, 3000.

The two images can be roughly aligned by using the target homography matrix.

In step S104, the two images are accurately aligned by using the least squares method so that stitching of the two images is completed.

Assuming that a feature point set of the image A is P, a feature point set of the image B is Q, N pairs of matching feature points exist in feature point set P and feature point set Q, and $p_i(x_i, y_i)$ and $q_j(x_j, y_j)$ belong to the feature point set P and the feature point set Q respectively and match each other, then the Euclidean distance between $p_i(x_i, y_i)$ and $q_j(x_j, y_j)$ is calculated by using the formula below.

$$\text{dist}_{pq} = \|p_i - q_j\| = \sqrt{(x_1 - x_j)^2 + (y_i - y_j)^2} \quad (10)$$

i is an integer and satisfies 0<i≤N, and j is an integer and satisfies 0<j≤K. K denotes the number of feature points in the feature point set Q.

The error is calculated by using the formula below.

$$\text{error} = \Sigma_{i=1}^{N} |(Rp_i + T) - q_j|^2 \quad (11)$$

R denotes a rotation matrix and T denotes a translation matrix.

The optimal solution to the formula (11) is found by using the least squares method. The optimal solution is the rotation matrix R and the translation matrix T with the smallest value of the error. The image A is mapped onto the image B through the rotation matrix R and the translation matrix T with the smallest value of the error.

In the preceding alignment operation, the two images can be accurately stitched together simply by using the target homography matrix as the initial value, supplemented by the rotation matrix R and the translation matrix T. Thus, spatial transformation constraints during image stitching are effectively minimized. The collected images are directly processed. Initialization is not required before automatic image stitching. Thus, the external operation for image stitching is simplified.

The present application further provides an embodiment of an electronic device corresponding to the preceding embodiment of the image processing method.

The embodiment of the electronic device of the present application may be implemented by software, hardware or a combination of thereof. Using implementation by software as an example, an apparatus in a logical sense is formed in the following manner: the processor of a device containing the apparatus in a logical sense reads corresponding computer program instructions stored in a non-volatile storage into a memory and then executes the instructions.

The electronic device 20 may include a processor; and a storage configured to store instructions executable by the processor. The processor is configured to perform the preceding method by using the executable instructions.

Figure 2:
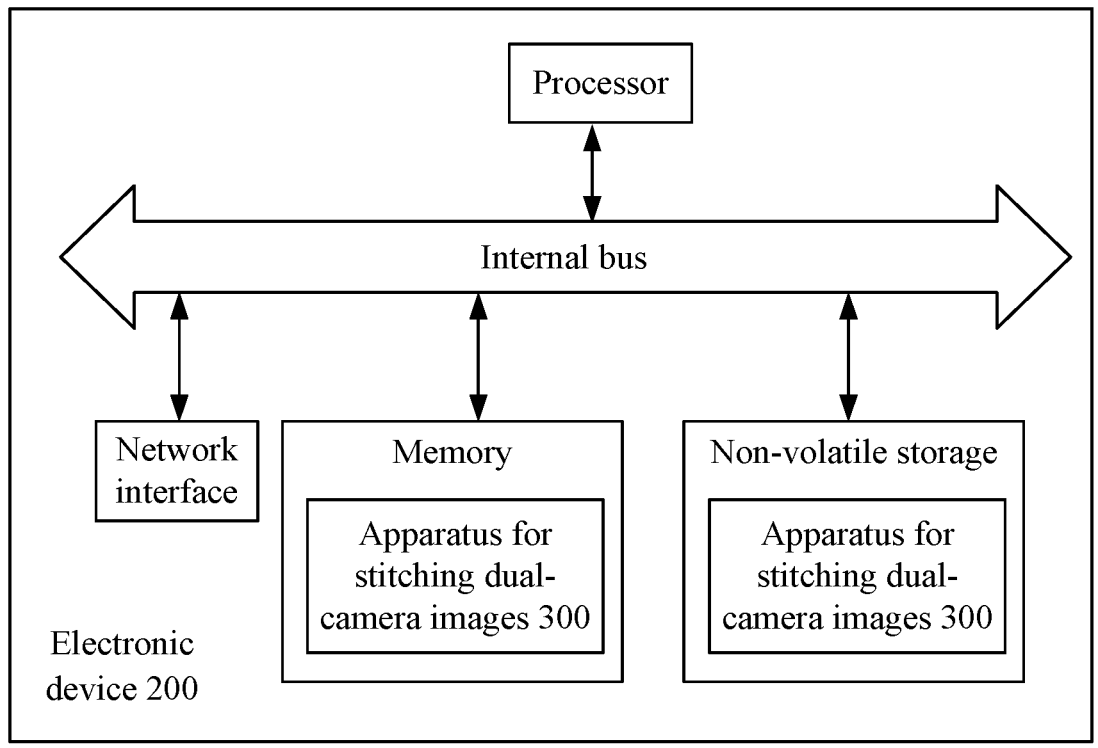
FIG. 2 is a schematic diagram illustrating the hardware structure of a device containing an apparatus for stitching dual-camera images according to an embodiment of the present application.

As regards hardware, as shown in FIG. 2, in addition to the processor, memory, network interface, non-volatile storage and internal bus, the electronic device 200 in the embodiment usually further includes other hardware according to the actual function of the device. Other hardware is not described here.

Figure 3:
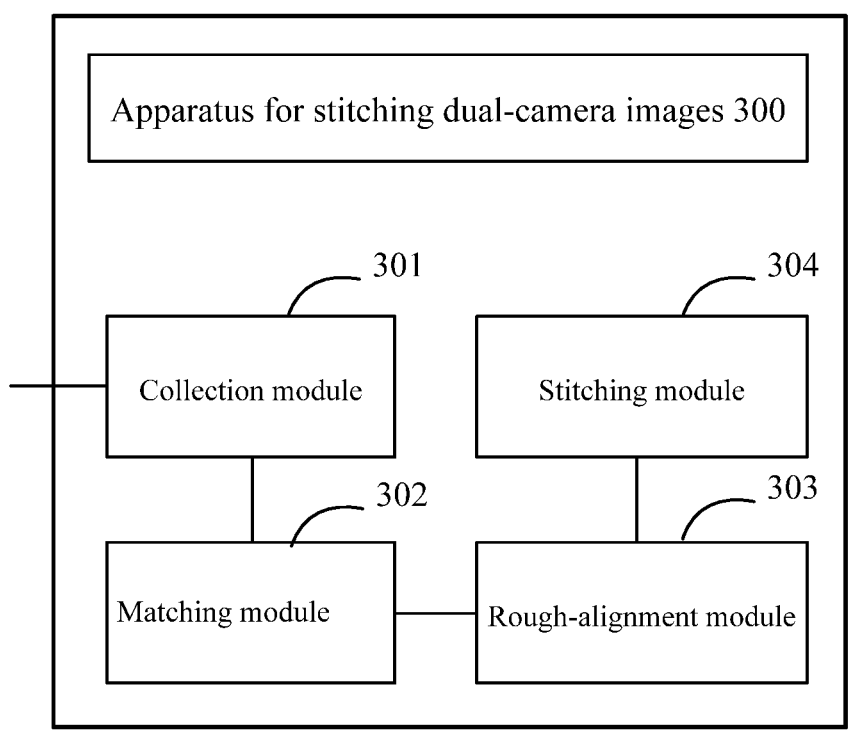
FIG. 3 is a block diagram of an apparatus for stitching dual-camera images according to an embodiment of the present application.

FIG. 3 is a block diagram of a display device according to an embodiment of the present application. As shown in FIG. 3, an apparatus for stitching dual-camera images 300 includes a collection module 301, a feature point extraction and matching module 302, a rough-alignment module 303 and a stitching module 304.

The collection module 301 is configured to collect two images having overlapping photographic content.

The feature point extraction and matching module 302 is configured to extract and match feature points of the two images.

The rough-alignment module 303 is configured to roughly align the two images by using a homography matrix.

The stitching module 304 is configured to accurately align the two images by using a least squares method to complete stitching the two images.

The image feature points may be SIFT feature points. In this case, the feature point extraction and matching module 301 includes a feature point extraction submodule, a gradient calculation submodule, a histogram calculation submodule and a feature point matching submodule.

The feature point extraction submodule is configured to find a feature point in a scale space of each of the two images separately according to an image multi-scale space and a Gaussian convolution kernel.

The gradient calculation submodule is configured to determine a gradient direction and an amplitude of the feature point by using a gradient distribution characteristic of pixels in a neighborhood of the feature point.

The histogram statistics collection submodule is configured to perform statistics on gradient directions and amplitudes corresponding to the pixels in the neighborhood of the feature point by using a histogram.

The feature point matching submodule is configured to construct a KD-Tree data structure for storing the feature points of the two images and match the feature points of the two images.

For the implementation process of the functions and uses of the modules in the preceding apparatus, see the implementation process of the corresponding steps in the preceding method. Details are not repeated here.

The apparatus embodiment substantially corresponds to the method embodiment. Thus, for related content, see partial description of the method embodiment. The apparatus embodiment is described illustratively. Units described as separate components in the apparatus embodiment may or may not be physically separated. Components presented as units in the apparatus embodiment may or may not be physical units, that is, may be located in one place or may be distributed over multiple network units. Part or all of the modules in the apparatus embodiment may be selected according to actual needs to achieve the object of the solution of the present application. Those of ordinary skill in the art can achieve understanding and implementation without creative work.

What is claimed is:

1. A method for stitching dual-camera images, comprising:
   collecting two images having overlapping photographic content;
   extracting and matching feature points of the two images;
   roughly aligning the two images by using a homography matrix; and
   accurately aligning the two images by using a least squares method to complete stitching the two images,
   wherein accurately aligning the two images by using the least squares method comprises:
   assuming that a feature point set of an image A of the two images is P, a feature point set of an image B of the two images is Q, N pairs of matching feature points exist between feature point set P and feature point set Q, and feature points $p_i(x_i, y_i)$ and $q_j(x_j, y_j)$ belong to feature point set P and feature point set Q respectively and match each other, then calculating an Euclidean distance between $p_i(x_i, y_i)$ and $q_j(x_j, y_j)$ by using the following formula:

$$\text{dist}_{pq}=\|p_i-q_j\|=\sqrt{(x_i-x_j)^2+(y_i-y_j)^2} \quad (10),$$

wherein i is an integer and satisfies 0<i≤N, and j is an integer and satisfies 0<j≤K, wherein K denotes a number of feature points in the feature point set Q;
   calculating an error by using the following formula:

$$\text{error}=\sum_{i=1}^{N}|(Rp_i+T)-q_j|^2 \quad (11),$$

wherein R denotes a rotation matrix and T denotes a translation matrix; and
   finding an optimal solution to the formula (11) by using the least squares method,
   wherein the optimal solution is the rotation matrix R and the translation matrix T with a smallest value of the error, and mapping the image A onto the image B through the rotation matrix R and the translation matrix T with the smallest value of the error.

2. The method of claim 1, wherein the feature points are Scale Invariant Feature Transform (SIFT) feature points.

3. The method of claim 2, wherein extracting and matching the feature points of the two images comprises:
   finding a feature point in a scale space of each of the two images separately according to an image multi-scale space and a Gaussian convolution kernel;
   determining a gradient direction and an amplitude of the feature point by using a gradient distribution characteristic of pixels in a neighborhood of the feature point;
   performing statistics on gradient directions and amplitudes corresponding to the pixels in the neighborhood of the feature point by using a histogram; and
   constructing a KD-Tree data structure for storing the feature points of the two images and matching the feature points of the two images.

4. The method of claim 1, wherein roughly aligning the two images by using the homography matrix comprises:
   with an image A of the two images as a reference image, randomly selecting M feature points $a_i$ from the image A, and finding M feature points $b_i$ in an image B of the two images that match the feature points $a_i$ in a one-to-one correspondence, wherein i is an integer and satisfies 0<i≤M;
   calculating the homography matrix through the M feature points $a_i$ and the M feature points $b_i$, projecting feature points in image A other than the feature points $a_i$ onto the image B through a space transformation of the homography matrix, and counting a number of accurate matching pairs between the feature points in the image A other than the feature points $a_i$ and feature points in the image B other than the feature points $b_i$,
   repeating the preceding steps multiple times to obtain a plurality of homography matrices, and selecting, from the plurality of homography matrices, one homography matrix having a largest number of accurate matching pairs as a target homography matrix; and
   roughly aligning the two images by using the target homography matrix.

5. The method of claim 4, wherein a number of times the homography matrix is repeatedly obtained is greater than or equal to 1000.

6. An apparatus for stitching dual-camera images, comprising a processor and a memory, wherein the memory stores instructions executable by the processor, and the processor is configured to:
   collect two images having overlapping photographic content;
   extract and match feature points of the two images;
   roughly align the two images by using a homography matrix; and
   accurately align the two images by using a least squares method to complete stitching the two images,
   wherein the processor is configured to:
   assume that a feature point set of an image A of the two images is P, a feature point set of an image B of the two images is Q, N pairs of matching feature points exist between feature point set P and feature point set Q, and feature points $p_i(x_i, y_i)$ and $q_j(x_j, y_j)$ belong to feature point set P and feature point set Q respectively and match each other, then calculate an Euclidean distance between $p_i(x_i, y_i)$ and $q_j(x_j, y_j)$ by using the following formula:

$$\text{dist}_{pq}=\|p_i-q_j\|=\sqrt{(x_i-x_j)^2+(y_i-y_j)^2} \quad (10),$$

wherein i is an integer and satisfies 0<i≤N, and j is an integer and satisfies 0<j≤K, wherein K denotes a number of feature points in the feature point set Q;
   calculating an error by using the following formula:

$$\text{error}=\sum_{i=1}^{N}|(Rp_i+T)-q_j|^2 \quad (11)$$

wherein R denotes a rotation matrix and T denotes a translation matrix; and
   finding an optimal solution to the formula (11) by using the least squares method,
   wherein the optimal solution is the rotation matrix R and the translation matrix T with a smallest value of the error, and mapping the image A onto the image B through the rotation matrix R and the translation matrix T with the smallest value of the error.

7. The apparatus of claim 6, wherein the feature points are Scale Invariant Feature Transform (SIFT) feature points.

8. The apparatus of claim 7, wherein the processor is configured to:
   find a feature point in a scale space of each of the two images separately according to an image multi-scale space and a Gaussian convolution kernel;
   determine a gradient direction and an amplitude of the feature point by using a gradient distribution characteristic of pixels in a neighborhood of the feature point;
   perform statistics on gradient directions and amplitudes corresponding to the pixels in the neighborhood of the feature point by using a histogram; and
   construct a KD-Tree data structure for storing the feature points of the two images and match the feature points of the two images.

9. A non-transitory computer-readable storage medium storing computer instructions for causing a processor to execute a method for stitching dual-camera images, comprising:
- collecting two images having overlapping photographic content;
- extracting and matching feature points of the two images;
- roughly aligning the two images by using a homography matrix; and
- accurately aligning the two images by using a least squares method to complete stitching the two images;
- wherein accurately aligning the two images by using the least squares method comprises:
- assuming that a feature point set of an image A of the two images is P, a feature point set of an image B of the two images is Q, N pairs of matching feature points exist between feature point set P and feature point set Q, and feature points $p_i(x_i, y_i)$ and $q_j(x_j, y_j)$ belong to feature point set P and feature point set Q respectively and match each other, then calculating an Euclidean distance between $p_i(x_i, y_i)$ and $q_j(x_j, y_j)$ by using the following formula:

$$\text{dist}_{pq} = \|p_i - q_j\| = \sqrt{(x_i - x_j)^2 + (y_i - y_j)^2} \quad (10),$$

wherein i is an integer and satisfies 0<i≤N, and j is an integer and satisfies 0<j≤K, wherein K denotes a number of feature points in the feature point set Q;
calculating an error by using the following formula:

$$\text{error} = \Sigma_{i=1}^{N} |(Rp_i + T) - q_j|^2 \quad (11),$$

wherein R denotes a rotation matrix and T denotes a translation matrix; and
- finding an optimal solution to the formula (11) by using the least squares method, wherein the optimal solution is the rotation matrix R and the translation matrix T with a smallest value of the error, and mapping the image A onto the image B through the rotation matrix R and the translation matrix T with the smallest value of the error.

10. The non-transitory computer-readable storage medium of claim 9, wherein the feature points are Scale Invariant Feature Transform (SIFT) feature points.

11. The non-transitory computer-readable storage medium of claim 10, wherein extracting and matching the feature points of the two images comprises:
- finding a feature point in a scale space of each of the two images separately according to an image multi-scale space and a Gaussian convolution kernel;
- determining a gradient direction and an amplitude of the feature point by using a gradient distribution characteristic of pixels in a neighborhood of the feature point;
- performing statistics on gradient directions and amplitudes corresponding to the pixels in the neighborhood of the feature point by using a histogram; and
- constructing a KD-Tree data structure for storing the feature points of the two images and matching the feature points of the two images.

12. The non-transitory computer-readable storage medium of claim 9, wherein roughly aligning the two images by using the homography matrix comprises:
- with an image A of the two images as a reference image, randomly selecting M feature points $a_i$ from the image A, and finding M feature points $b_i$ in an image B of the two images that match the feature points $a_i$ in a one-to-one correspondence, wherein i is an integer and satisfies 0<i≤M;
- calculating the homography matrix through the M feature points $a_i$ and the M feature points $b_i$, projecting feature points in image A other than the feature points $a_i$ onto the image B through a space transformation of the homography matrix, and counting a number of accurate matching pairs between the feature points in the image A other than the feature points $a_i$ and feature points in the image B other than the feature points $b_i$;
- repeating the preceding steps multiple times to obtain a plurality of homography matrices, and selecting, from the plurality of homography matrices, one homography matrix having a largest number of accurate matching pairs as a target homography matrix; and
- roughly aligning the two images by using the target homography matrix.

13. The non-transitory computer-readable storage medium of claim 12, wherein a number of times the homography matrix is repeatedly obtained is greater than or equal to 1000.

* * * * *